US 6,617,973 B1

(12) United States Patent
Osterman

(10) Patent No.: US 6,617,973 B1
(45) Date of Patent: Sep. 9, 2003

(54) UNDERGROUND BATTERY VAULT SYSTEM FOR COMMUNICATIONS APPLICATIONS

(76) Inventor: Thomas A. Osterman, 911 Western Ave., Suite 206, Seattle, WA (US) 98104

( * ) Notice: Subject to any disclaimer, the term of this patent is extended or adjusted under 35 U.S.C. 154(b) by 0 days.

(21) Appl. No.: 10/096,783

(22) Filed: Mar. 12, 2002

Related U.S. Application Data

(63) Continuation-in-part of application No. 09/544,778, filed on Apr. 7, 2000, now Pat. No. 6,356,434.
(60) Provisional application No. 60/128,499, filed on Apr. 9, 1999.

(51) Int. Cl.[7] ............................................. G08B 21/00
(52) U.S. Cl. .................... 340/636.1; 429/96; 429/100; 320/567.1; 361/641
(58) Field of Search ........................ 340/636.1; 429/96, 429/100; 320/567.1, 484; 361/641

(56) References Cited

U.S. PATENT DOCUMENTS

| 4,815,363 | A | | 3/1989 | Harvey |
| 6,006,944 | A | * | 12/1999 | Machledt ................. 220/567.1 |
| 6,111,519 | A | | 8/2000 | Bloss, Jr. et al. |
| 6,356,434 | B1 | * | 3/2002 | Osterman ................... 361/641 |

* cited by examiner

Primary Examiner—Julie Lieu
(74) Attorney, Agent, or Firm—Michael R. Schacht; Schacht Law Office, Inc.

(57) ABSTRACT

A vault system for batteries that supply a battery power signal to an electronic device. The vault system comprises an outer enclosure assembly that contains the batteries. Power cables extend from the outer enclosure assembly to the electronic device. The vault system protects the batteries and related electronics, removes fluid from within the outer enclosure assembly, and/or allows the status of the vault system to be accessed remotely.

12 Claims, 8 Drawing Sheets

UNDERGROUND BATTERY VAULT SYSTEM FOR COMMUNICATIONS APPLICATIONS

RELATED APPLICATIONS

This is a continuation-in-part of U.S. Ser. No. 09/544,778 filed Apr. 7, 2000, now U.S. Pat. No. 6,356,434 which claims benefit of U.S. Provisional Patent Application Serial No. 60/128,499, filed Apr. 9, 1999.

TECHNICAL FIELD

The present invention relates to underground vaults for storing batteries and, more specifically, to the storage of batteries used by electrical devices such as uninterruptible power supplies distributed throughout a communications system.

BACKGROUND OF THE INVENTION

Electrical devices are often stored in remote locations and employ batteries for primary or standby power. For example, uninterruptible power supply (UPS) systems are often distributed throughout communications systems to provide power to active components of such systems in the event of utility power failure. Many such UPS systems are connected to batteries that provided power that allows the communication system to operate for a short period of time until utility power is recovered or another source of power can be started.

The present invention is of particular relevance when used in connection with UPS systems distributed throughout a communications system, and that application will be described in detail herein. However, the present application may have broader application to other electrical devices, so the scope of the present invention shall be determined by the claims appended hereto and not the following detailed description. As examples, the present invention may be used to store batteries for use with telecommunications equipment, traffic lights, communications repeaters, and the like.

The batteries used by such UPS systems may be stored in cabinets attached to utility poles or in above-ground cabinets but are often stored in underground vaults. Underground vaults are commonly a concrete, fiberglass, and/or plastic structure that is buried adjacent to the UPS system. A cable is run from the batteries in the vault to the UPS system to allow the UPS system to generate a standby AC power signal from the DC battery power signal.

Underground storage of UPS batteries is often preferable to above surface cabinets, pole mounted cabinets, and the like for a variety of reasons. In particular, underground vaults: do not require above ground cabinets and thus have less aesthetic impact on the surrounding environment; maintain the batteries at cooler temperatures and thus prolong battery life, which can increase reliability of the UPS system; are less susceptible to damage from vandalism and vehicle accidents; are easier to access for maintenance staff; and are relatively cost-effective to install and upgrade with fewer siting limitations.

A primary problem with underground battery vaults is that a high water table, poor drainage, and the like can flood the battery compartment defined by the vault. A flooded battery compartment can result in short circuiting of the battery terminals and accelerated corrosion of the terminals and related hardware. In addition, such ground water can deposit mud, silt, and other debris on the battery terminals and related hardware that remains after the flood recedes and can interfere with reliability, maintenance, and proper operation of the batteries.

Another problem is that the batteries themselves can fail in a number of ways that might release battery chemicals into the environment.

The need thus exists for systems and methods that protect and contain batteries stored in underground vaults.

RELATED ART

Bell jar systems are often used to protect batteries in underground vaults from flooding. A bell jar system attempts to form a chamber at the top of a battery that traps air over the battery terminals and related hardware during flood conditions. Under some conditions, the trapped air will prevent the terminals and related hardware from becoming immersed in water even if the vault is completely flooded.

However, in many conditions bell jar systems fail to protect the battery terminals and related hardware. Voids, cracks, and holes in the bell jar structure can prevent the trapping of air, allowing the battery terminals and related hardware to be flooded. Even if the bell jar structure properly traps air around the upper portion of the battery, a number of problems can arise.

First, the trapped air will be relatively moist, which results in condensation on the battery terminals and related hardware. This condensation can establish a leakage path that will reduce the effectiveness of the batteries as part of the UPS system electrical circuit and may result in accelerated corrosion because of dissimilar metals used to manufacture the terminals and related hardware.

Second, not only will air be trapped, but hydrogen vented from the batteries may also be trapped. This build-up of hydrogen is undesirable for a number of reasons.

The need thus exists for improved systems and methods for protecting and containing batteries stored in underground vaults.

SUMMARY OF THE INVENTION

The present invention is a vault system for batteries that supply a battery power signal to an electronic device. The vault system comprises an outer enclosure assembly that contains the batteries. Power cables extend from the outer enclosure assembly to the electronic device. The vault system protects the batteries and related electronics, removes fluid from within the outer enclosure assembly, and/or allows the status of the vault system to be accessed remotely.

DETAILED DESCRIPTION OF THE INVENTION

The present invention may be embodied in numerous forms. The following discussion describes two exemplary embodiments of the present invention. Each of these two embodiments will be described herein in detail.

I. First Embodiment

Figure 1:
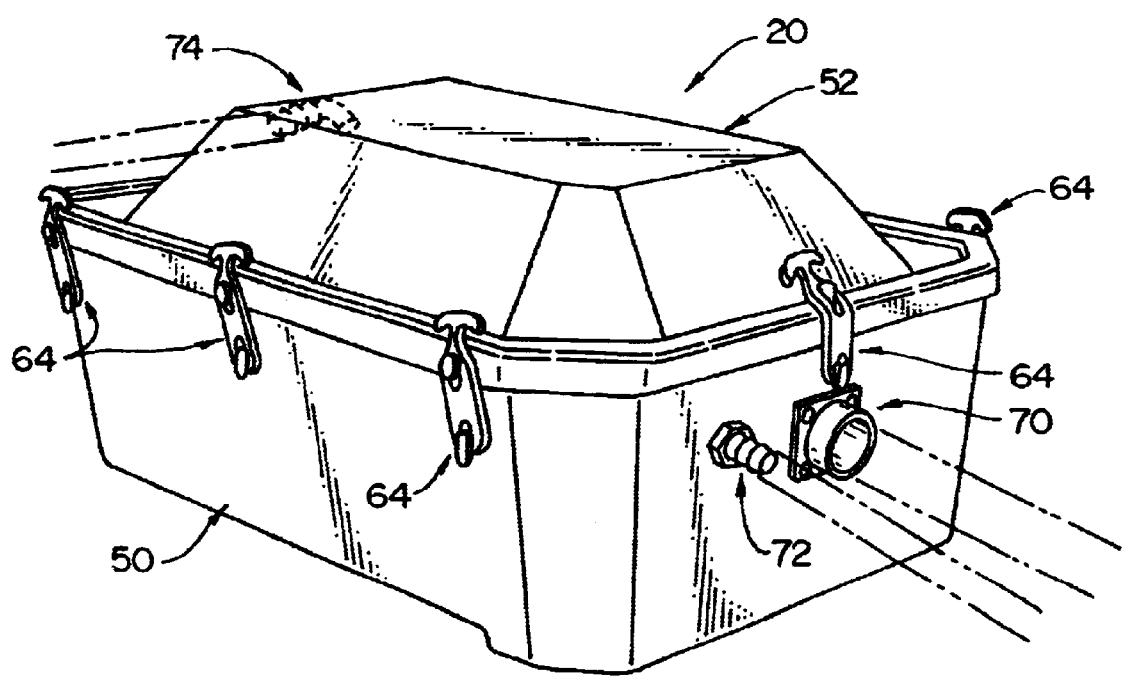
FIG. 1 is a perspective view of the battery vault system of the present invention.

Referring initially to FIG. 1 of the drawing, depicted at 20 therein is a battery vault system constructed in accordance with, and embodying, the principles of a first embodiment of the present invention. The battery vault system 20 comprises a mechanical portion and an electrical portion that cooperate to allow one or more batteries to be connected to an electrical device such as a UPS system. The batteries and electrical device are or may be conventional and will be described herein only to the extent required for a complete understanding of the vault system 20.

Figure 2:
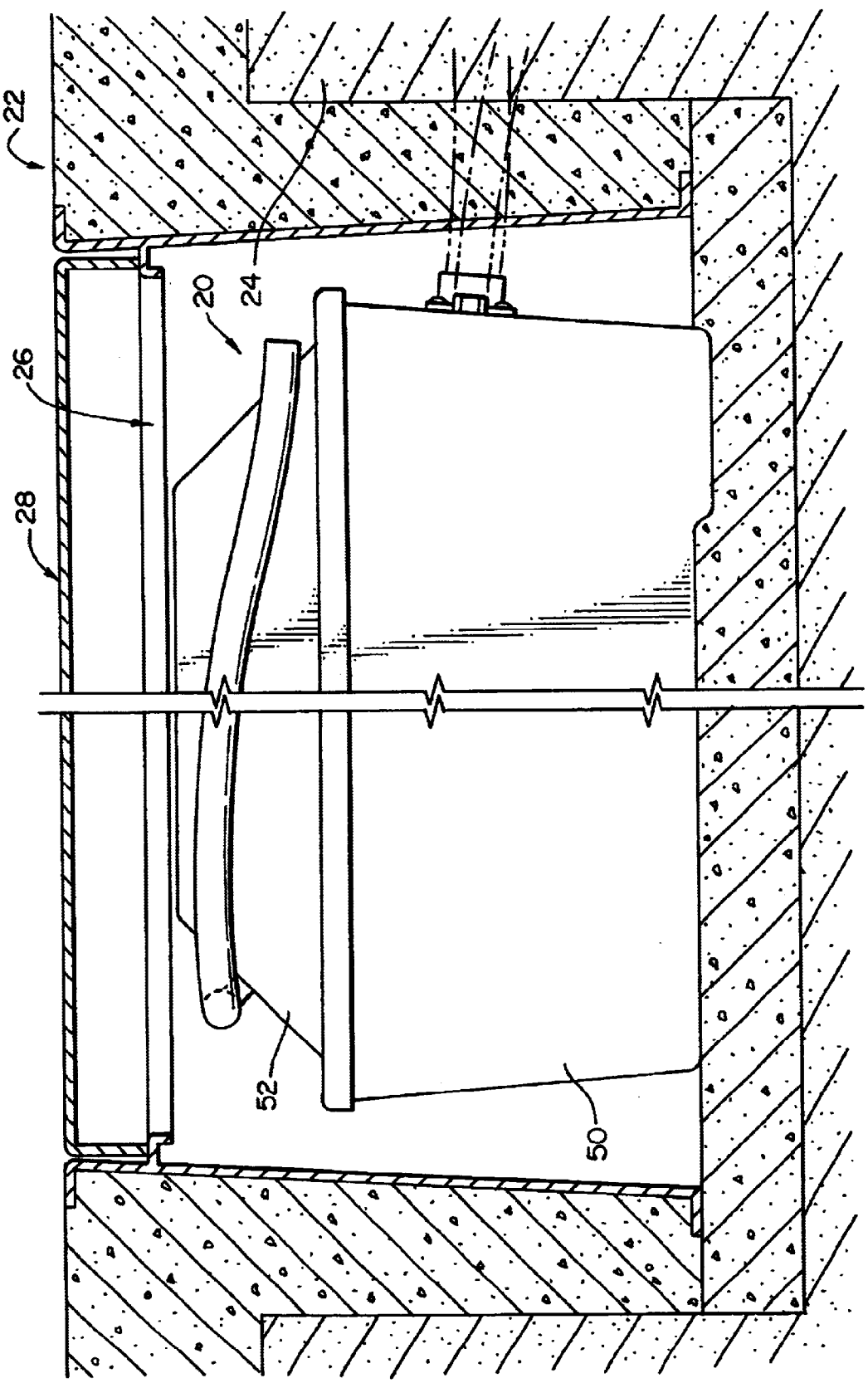
FIG. 2 is a side elevation view of the vault enclosure system of FIG. 1 within an external vault assembly.

Referring for a moment to FIG. 2, it can be seen that the vault system 20 is adapted to be placed into an external vault member 22 that is buried in the ground 24. The exemplary external vault member 22 is a generally rectangular body having five closed sides and an opening 26 formed in its upper side. The external vault member 22 is made of concrete, fiberglass, plastic, or a combination thereof and may be formed in shapes other than rectangular such as cylindrical. The opening 26 is preferably covered by a lid member 28 that may also be made of concrete, fiberglass, and/or plastic. The external vault member 22 and lid member 28 are or may be conventional and will not be discussed herein in detail.

Figure 3:
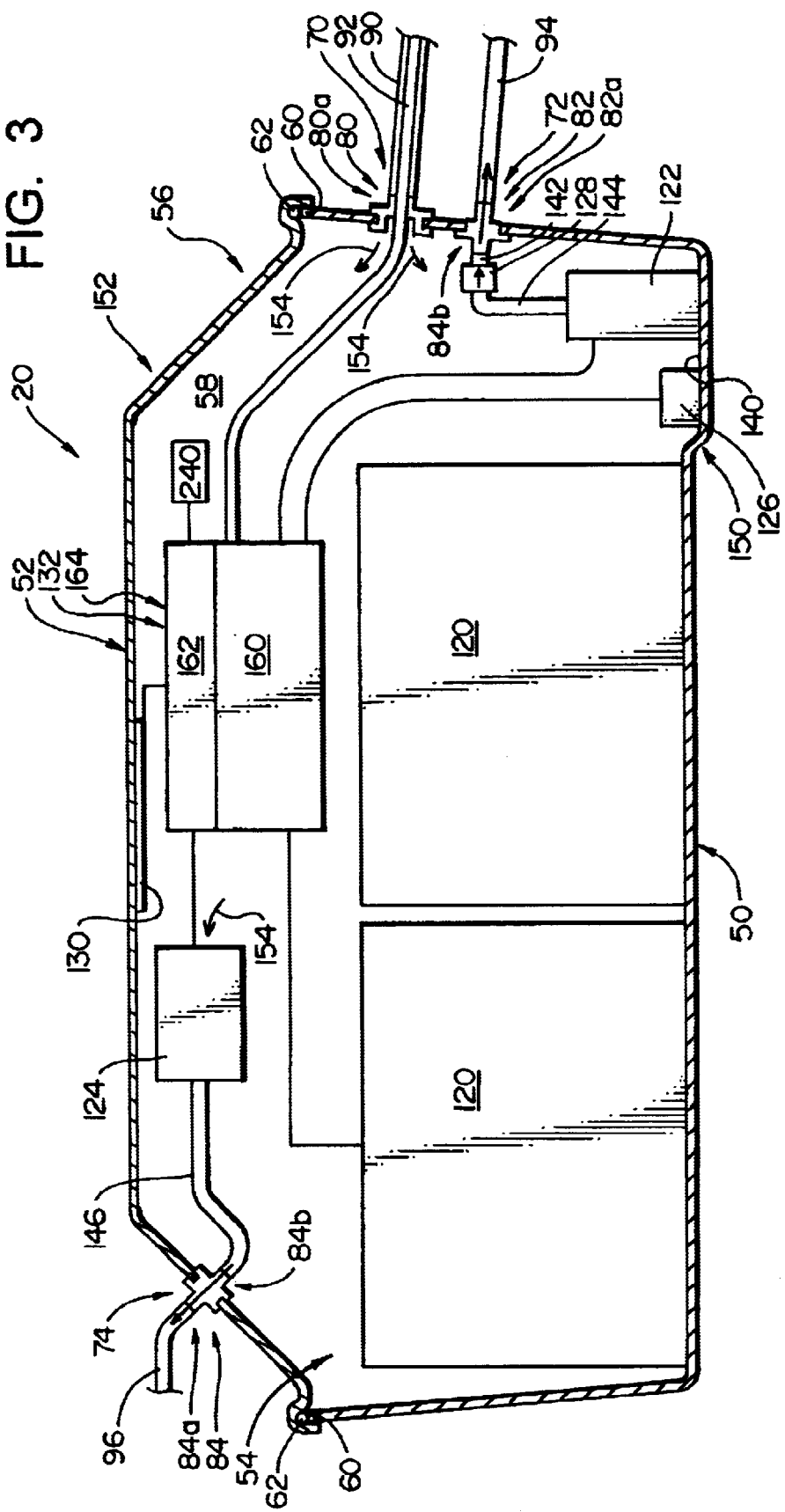
FIG. 3 is a somewhat schematic, side elevation section view of the vault enclosure system of FIG. 1.

FIGS. 1–3 show that the vault system 20 comprises an inner vault member 50 and a cover 52. The inner vault member 50 is sized and dimensioned to contain a number, typically four, six, or eight, of batteries. The cover 52 engages the inner vault member 50 to cover an opening 54 therein and form a sealed vault enclosure assembly 56 defining a sealed chamber 58.

In particular, the cover 52 mates with an upper perimeter edge 60 of the inner vault member 50. A gasket or seal member 62 is arranged between upper edge 60 and the cover 52. A plurality of latch assemblies 64 are spaced around the perimeter edge 60 of the inner vault member 50. These latch assemblies 64 engage the cover 52 to form a water tight seal between the cover 52 and the inner vault member 50. These latch assemblies are or may be conventional and will not be described herein in detail.

The enclosure assembly 56 defines first, second, and third ports or openings 70, 72, and 74. In the exemplary vault system 20, the first and second ports 70 and 72 are formed in the inner vault member 50 and the third port 74 is formed in the cover 52. Other arrangements of the ports 70–74 are possible within the functional constraints described below.

Referring now to FIG. 3, first and second fitting assemblies 80 and 82 are connected to the inner vault member 50 at the first and second ports 70 and 72, and a third fitting assembly 84 is connected to the cover 52 at the third port 74. A wiring conduit 90 is connected to an outer portion 80*a* of the first fitting assembly. The wiring conduit 90 extends out of the external vault member 22 to at least above ground and preferably to a housing or cabinet containing the electronic device to be powered. A cable bundle 92 extends through the wiring conduit 90 and into the sealed chamber 58 of the vault enclosure assembly 56 through the first port 70.

A liquid outlet hose 94 is connected to an outer portion 82*a* of the second fitting assembly 82. The liquid outlet hose 94 extends out of the external vault member 22 to a drain or other location where groundwater may be disposed of.

A gas outlet hose 96 is connected to an outer portion 84*a* of the third fitting assembly 84. The gas outlet hose 96 extends out of the external vault member 22 to a place where hydrogen can be vented without excessive accumulation or otherwise properly contained, used, or disposed of.

FIG. 3 also shows that the vault enclosure assembly 56 contains a plurality of batteries 120, a first pump 122, a second pump 124, a float switch 126, a check valve 128, a hydrogen sensor 130, and a control box 132. The first pump 122 is mounted to the cover 52. The second pump 124 and the float switch 126 are mounted on a bottom surface 140 of the inner vault member 50.

The cable bundle 92 that extends through the first port 70 is connected to the control box 132 as will be described in further detail below. First and second fluid hoses 142 and 144 connect the check valve 128 on one side to an inner portion 82*b* of the fitting assembly 80 and on the other side to the first pump 122. The check valve 128 is arranged to allow fluid to flow only from the pump 122 out of the enclosure assembly 56 through the second port 72. A gas hose 146 is connected between the second pump 124 and an inner portion 84*b* of the third fitting assembly 84.

As shown in FIG. 3, the inner vault member 50 comprises a sump portion 150 that defines a lower most portion of the sealed chamber 58; any liquid within the chamber 58 will thus collect in this sump portion 150. In addition, the first pump 122 and float switch 126 are located in this sump portion 150. As will be described in further detail below, the first pump 122 operates, in some situations under control of the float switch 126, to pump water within the enclosure 56 out of the chamber 58 through the first fluid hose 142, the check valve 128, the second fluid hose 144, the second fitting assembly 82, and the liquid outlet hose 94.

The cover 52 comprises a narrowed upper portion 152 in which the second pump 124 and hydrogen sensor 130 are mounted. The second pump 124 operates, under control of an algorithm or the hydrogen sensor 130, to draw air through the wiring conduit 90 as shown by arrows 154 and force this air, and any hydrogen that has collected in the narrowed upper portion 152, out of the sealed chamber 58 through the gas hose 146, the third fitting assembly 84, and the gas outlet hose 96. In this context, it should be noted that a seal should be established between the wiring conduit 90 and the first fitting assembly 80 to prevent moisture from being drawn into the sealed chamber 58.

The first and second pumps 122 and 124 are or may be conventional marine bilge pumps that are designed for use in potentially explosive environments. This type of pump is conventional, and the pumps 122 and 124 will not be described herein in further detail. The float switch 126, check valve 128, and hydrogen sensor 130 also may be or are conventional and thus will not be described herein in detail.

The control box 132 is not conventional. This box 132 comprises a container portion 160 and a lid portion 162 that join together to form sealed control enclosure 164 in which certain electrical devices are located and certain electrical connections are made. The box 132 is relevant primarily in that, even if the interior of the sealed chamber 58 is flooded, the electronics and connections within the box 132 will remain dry.

Figure 4:
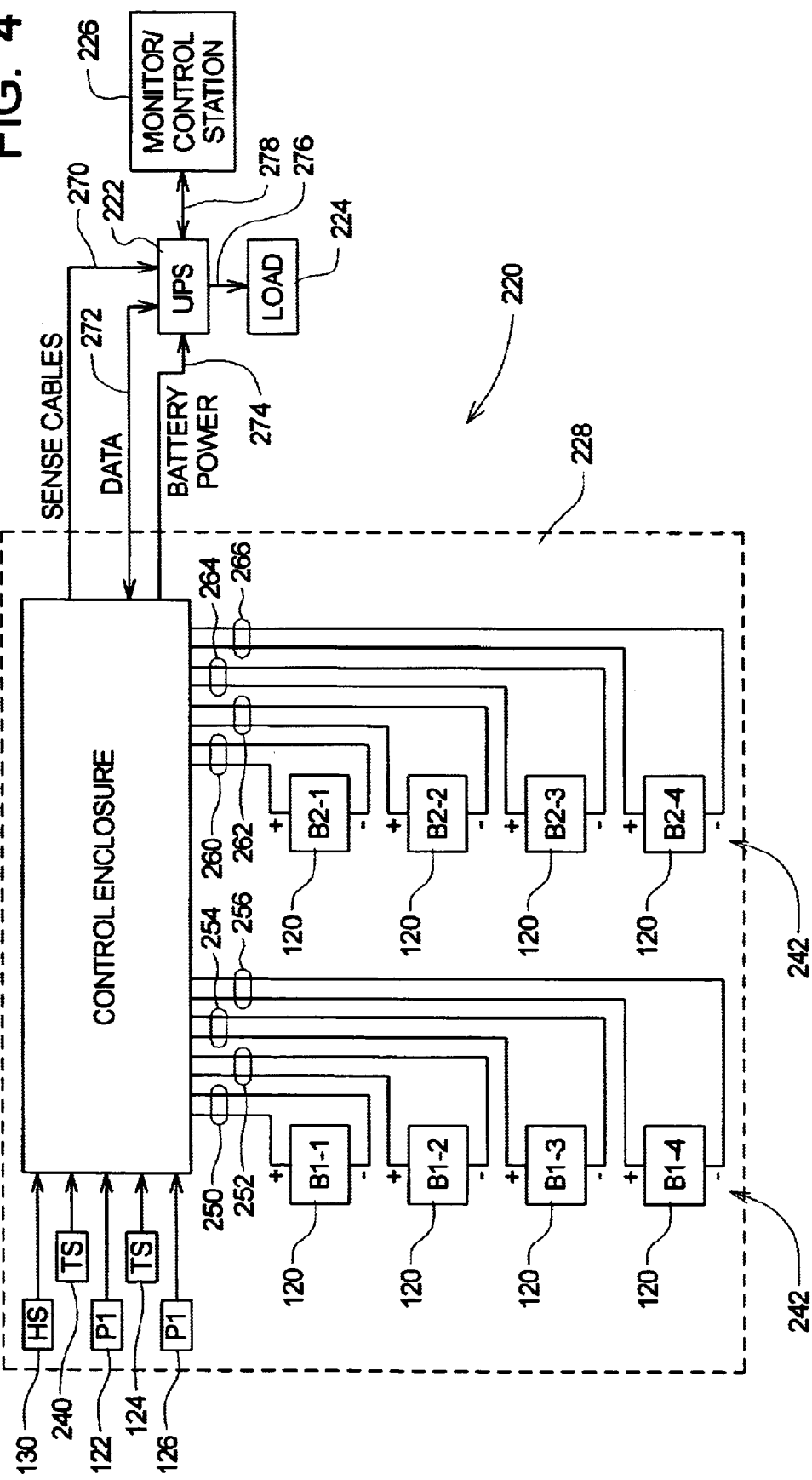
FIG. 4 is a block diagram illustrating the electrical portion of the battery vault system of FIG. 1 in a common environment in which it may be used.

Referring now to FIG. 4, depicted at 220 therein is a block diagram of the electrical system in which the vault system 20 may be used. In particular, FIG. 4 shows the relation of vault system 20 to this broader electrical system 220 with a UPS system 222, load 224, and remote monitor/control station 226. Dotted lines 228 indicate which electrical components are associated with the vault system 20.

In particular, the batteries 120, first pump 122, second pump 124, float switch 126, hydrogen sensor 130, and control box 132 are all schematically depicted in FIG. 4. In addition, FIG. 4 shows a temperature switch 240 forming a part of the system 20. In the exemplary system 20, two sets 242 and 244 of four batteries 120 are used, although more or fewer batteries may be used in different configurations.

Lead pairs 250, 252, 254, and 256 are connected between the batteries of the first set 242 and the control box 132, while lead pairs 260, 262, 264, and 266 are connected between the batteries of the second set 244 and the control box 132.

A bundle of sense cables 270, a data cable 272, and battery power cables 274 extend between the control box 132 and the UPS system 222. Power cables 276 extend between the UPS system 222 and the load 224. A communications line 278 allows data communication between the UPS system 222 and a remote control/monitor station 226 such as a central office or headend.

Figure 5:
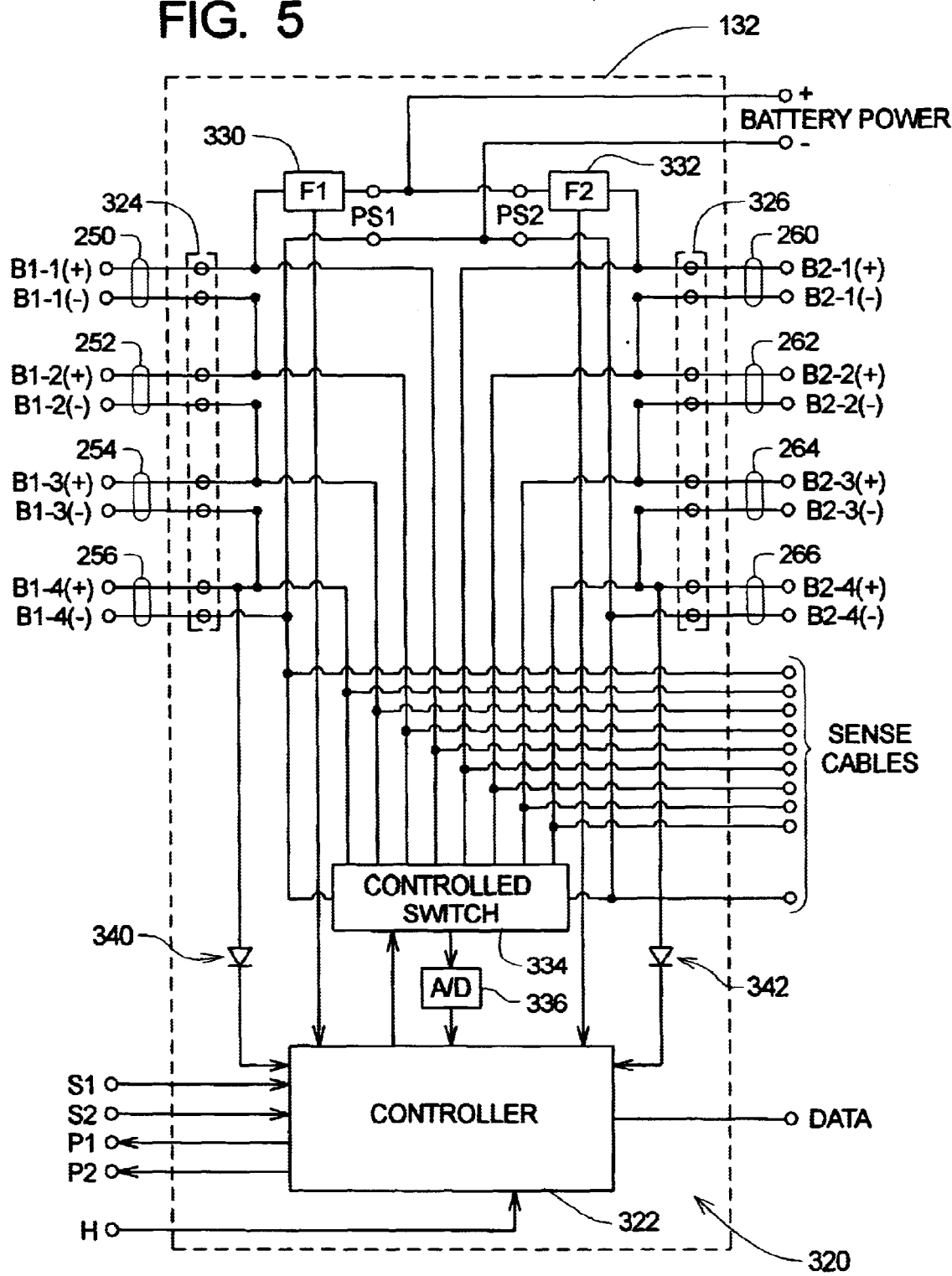
FIG. 5 is a block diagram illustrating a control circuit employed by the battery vault system of FIG. 1.

Referring now to FIG. 5, depicted at 320 therein is an electrical circuit contained by the control box 132. The electrical circuit 320 comprises a controller 322, first and second sets of terminals 324 and 326, first and second fuses 330 and 332, a controlled switch 334, an analog to digital converter 336, and power supply diodes 340 and 342.

The controller 322 receives data from the float switch 126, the hydrogen sensor 130, the temperature sensor 240, the data line 272, and the fuses 330 and 332 and processes this data according to an internal software program. Based on this data, the software program operates the first and second pumps 122 and 124 and sends data over the data line 272 to the UPS system 222. The UPS system 222 can in turn forward this data to the monitor control station 226 for further processing and analysis.

The lead pairs 250–256 and 260–266 route into the control box 132 via watertight connector fittings.

In addition, the terminal sets 324 and 326 allow the lead pairs 250–256 and 260–266 to be connected as appropriate for generation of the battery power signal. In particular, the first and second terminal sets 324 and 326 are connected such that the voltages across the batteries in the first and second battery sets 242 and 244 are added to generate first and second power signals PS1 and PS2. These power signals PS1 are, in the exemplary system 20, equal to 48 volts, assuming that the batteries 120 are fully charged 12 volt batteries. Other voltages can be obtained with different battery sets and batteries. Terminal sets 324 and 326 are connected in parallel such that the battery power signal is based on both the first and second power signals PS1 and PS2.

The fuses 330 and 332 are connected in series with the first and second terminal sets 324 and 326 to protect the electronics in case of a short circuit or other failure.

The terminal sets 324 and 326 are also connected to the controlled switch array 334. The controller 322 can operate the controlled switch array 334 to pass certain voltages to the A/D converter 336 such that the voltage across the positive and negative terminals of any of the batteries 120 can be measured. Because the controller 322 measures the voltage across individual batteries and not simply across an entire set of batteries, a battery that is failing or otherwise not charging properly may be detected and serviced.

In some situations, the UPS system 222 is configured to measure and battery voltages, and the sense cables 270 are provided to allow a clean, neat, and easy connection to be made between the UPS and the battery terminals.

The power supply diodes 340 and 342 are preferably connected across one battery in each of the battery sets 242 and 244 to provide a redundant power source for the controller 322, but the exact power source for the controller 322 is not critical and will depend upon the specific implementation of the system 20.

The software program run by the controller 322 can be programmed for a specific environment but will typically perform the following functions.

First, the software program can operate the first pump 122 based on the float switch 126 to eliminate water from with the sealed chamber 58. Typically, but not necessarily, the software program will count the frequency and duration of operation of the pump 122. If the first pump 122 operates too frequently and/or for too long (e.g. stuck on), one may infer that a large leak has occurred and/or that the pump 122 has failed and take appropriate steps to maintain the system 20.

Second, the software program can operate the second pump 124 to vent the sealed chamber 58 based on the temperature within the chamber as measured by the temperature sensor 240 and on the voltage across the individual batteries 120. The rate of hydrogen vented from a battery depends upon such factors as the type of battery, the age and condition of the battery, and the temperature of and charge across the battery. Accordingly, the system 20 can eliminate hydrogen even without the hydrogen sensor 130. The hydrogen sensor 130 can thus be optionally added to detect slightly higher levels of hydrogen as a back-up measure.

Third, the software program can monitor the status of the fuses 330 and 332 and, if these fuses 330 and 332 are blown, an alarm signal can be generated indicating that appropriate maintenance is required.

II. Second Embodiment

Figure 6:
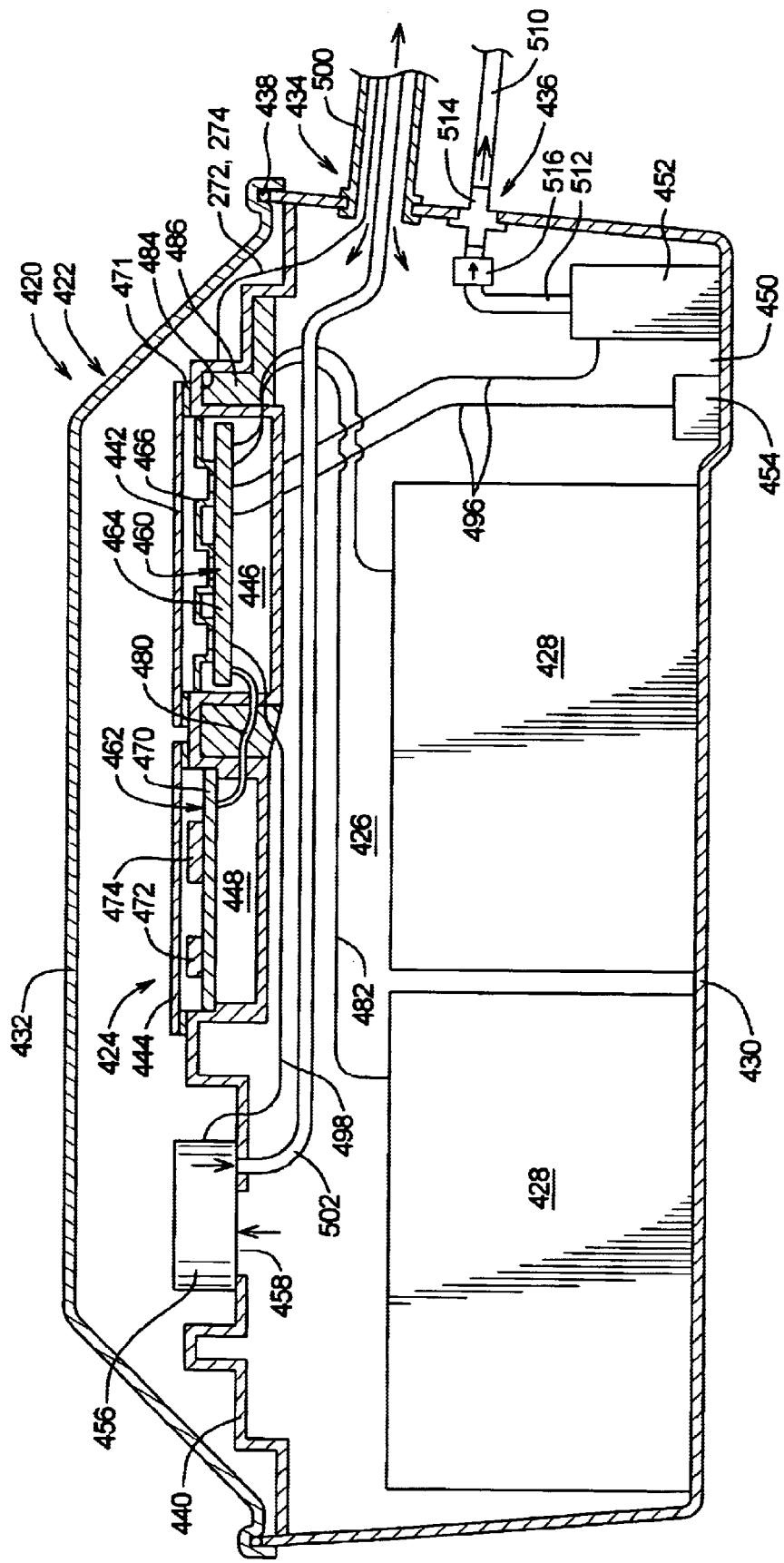
FIG. 6 is a somewhat schematic, side elevation section view of a second embodiment of a vault enclosure system of the present invention.
Figure 7:
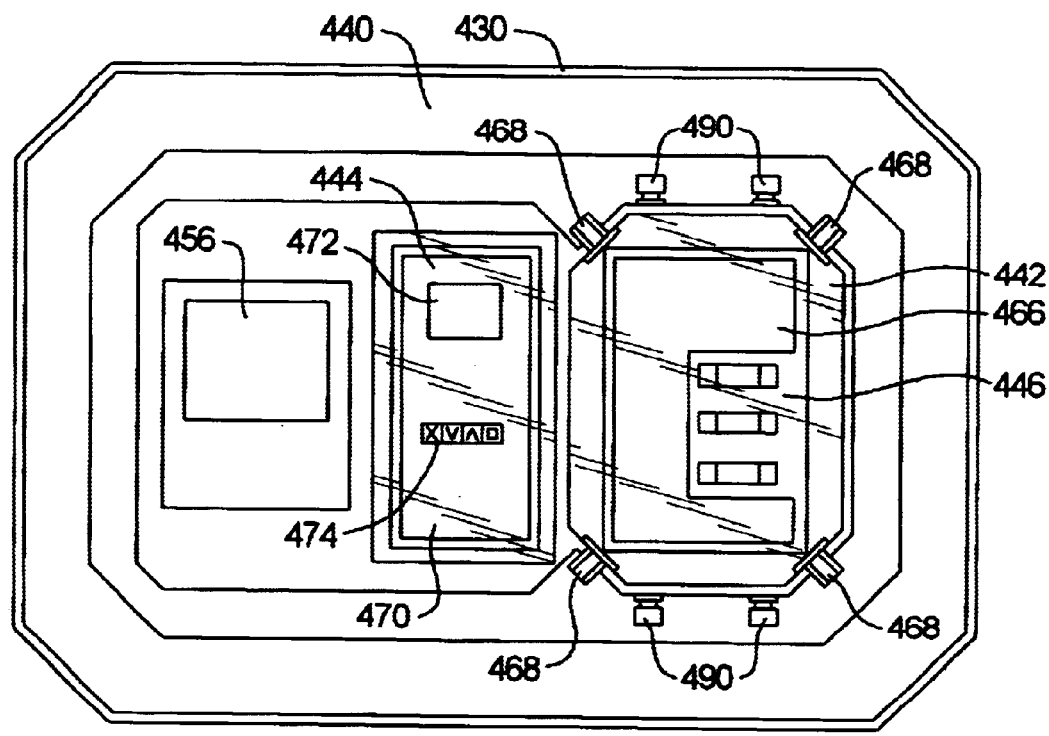
FIG. 7 is a top plan view depicting a tray assembly of the vault enclosure system of FIG. 6.
Figure 8:
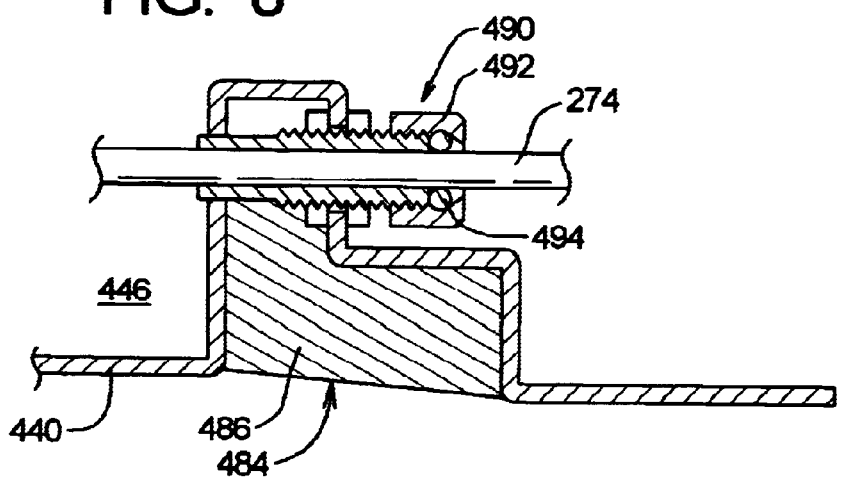
FIG. 8 is a section view depicting an exemplary screw port used by the tray assembly of FIG. 7.

Referring now to FIGS. 6–8 of the drawing, depicted at 420 therein is a second embodiment of a vault assembly constructed in accordance with, and embodying, the principles of the present invention.

The vault assembly 420 comprises an outer enclosure assembly 422 and an inner enclosure assembly 424. The outer enclosure assembly 422 defines an outer chamber 426. Batteries 428 are arranged within the outer chamber 426.

The outer enclosure assembly 422 comprises a base member 430 and a cover member 432. First and second ports 434 and 436 are formed in the base member 430. A gasket 438 is arranged between the base member 430 and cover member 432 to substantially seal the outer chamber 426.

The exemplary inner enclosure assembly 424 comprises a tray member 440 and first and second cover members 442 and 444; the cover members 442 and 444 engage the tray member to define first and second inner chambers 446 and 448. The tray member 440 is supported by the base member 430 within the outer chamber 426.

The base member 430 defines a sump portion 450 that, during normal use, defines the lowest area within the outer chamber 426. A pump 452 and float switch 454 are located in the sump portion 450 of the outer chamber 426. A blower assembly 456 is supported by the tray member 440 above a blower opening 458 formed in the tray member 440. The blower assembly 456 is operated at least frequently and possibly continuously to expel gasses from within the outer chamber 426.

Arranged within the first and second inner enclosures 446 and 448 are first and second circuit assemblies 460 and 462, respectively. The exemplary first circuit assembly 460 comprises a first circuit board 464 and board cover 466. Referring for a moment to FIG. 7, it can be seen tha the first cover member 442 is preferably held in place above the board cover 466 using a plurality of resilient retaining straps 468 that hold the cover member 442 in place. The exemplary second circuit assembly 462 comprises a second circuit board 470, a display unit 472, and a data input unit 474.

The first and second circuit assemblies 460 and 462 contain electrical components of the electrical circuit 320 described above. The first and second cover members 442 and 444 are secured to the tray member 440 such that the first and second inner chambers 446 and 448 are sealed. However, the first cover member 442 is detachably attached to the tray member 440, while the second cover member 444 is permanently attached to the tray member 440.

The permanent attachment of the second cover member 444 to the tray member 440 allows the establishment of a secure, fluid tight seal of the gap between the cover member 44 and the tray member 440. A gasket 470 arranged between the first cover member 442 and the tray member 440 also establishes a fluid tight seal of the gap between the cover member 442 and the tray member 440, but this seal will be more susceptible to failure than the permanent factor seal formed between the second cover member 444 and the tray member 440.

Therefore, the more expensive electrical components of the circuit 320 are placed on the second circuit board 470, while less expensive components and/or components that must be serviced on site are placed on the first circuit board 470. Examples of the more expensive components arranged on the second board 470 include microprocessors, LCD's, keypads, and the like. Examples of components that require on site access and thus are placed on the first circuit board 464 include terminal sets, fuses and fuse receptacles, and the like.

While the components within the second inner chamber 448 may not be directly touched, the second cover member 444 is preferably made of a clear, flexible waterproof material. The use of a clear material renders the display unit 472 and input device 474 visible to a user. The use of a flexible material allows the user to interact with the input device 474 to make selections as necessary.

FIG. 6 shows that electrical conductors are used to interconnect the various electrical components of the electrical system 220 described above. When possible, these conductors are permanently connected to the vault assembly 420 during manufacture.

In particular, a ribbon connector 480 carries electrical signals between the first and second circuit boards 464 and 470. Lead pairs 482 are connected to between the batteries 428 and the first circuit board 464. The tray member 440 defines a perimeter groove 484 that extends around at least a portion of the first inner chamber 446. The exemplary groove 484 extends between one side of the first inner chamber 446 and the second inner chamber 448. The ribbon cable 480 and lead pairs 482 extend through holes formed in the tray member 440; these holes are sealed by a potting compound 486 that is poured into the groove 484 and allowed to harden. The potting compound 486 thus ensures a tight seal around these conductors 480 and 482.

Other connectors cannot be permanently connected to the vault assembly 420 during manufacture, and electrical components that must be accessed by such connectors are located in the first inner chamber 446. Referring for a moment to FIGS. 7 and 8, it can be seen that cable ports 490 are formed in the tray member 440 to allow conductors to be connected to the components within the first inner chamber 446 on site.

For example, the battery power cables 274 described above need to be installed on site and are inserted through one of the cable ports 490. The cable ports 490 employ a compression fitting comprising a compression ring 492 and an O-ring 494 that allow a seal to be formed around each of the cables 274. Pump control cables 496 and blower control cables 498 may also be installed in a similar manner.

The pump 452 is connected to a control circuit on the second circuit board 470 that periodically turns on the pump 452. As in generally known in the art of marine pumps, the control circuit monitors current draw of the pump 452. This current draw can indicate whether the pump 452 is operating correctly. The current draw can also indicate the presence of a load on the pump 452 that indicates that the pump 452 is removing water from the outer chamber 426. In this case, the pump 452 will be kept on until the water is removed; an alarm signal may also be generated indicating that the seal on the outer enclosure assembly 422 has been breached and requires maintenance.

FIG. 6 shows that a conduit 500 is connected to the first port 434 formed in the base member 430. The conduit 500 forms a fluid tight seal to prevent water from leaking around the conduit 500 into the outer chamber 426. The conduit 500 is typically connected to a destination point such as a cabinet containing a UPS or other load as described elsewhere herein. A blower hose 502 is connected at one end to the blower assembly 456 and at its other end to the destination point. The destination point will be at a high location and protected so that air may enter the conduit 500 but not water. The destination point will also allow fluids flowing through the blower hose 502 to be harmlessly expelled into the ambient air.

In the exemplary vault assembly 420, the blower hose 502 is arranged within the conduit 500. The conduit 500 further contains electrical conductors such as the data lines 272 and the power lines 274.

A waste water line 510 is connected to the second port 436 in the base member 430. The pump assembly 452 is connected by a pump line 512 to the wastewater line 510 through a fitting 514. The other end of the waste water line 510 is arranged at a disposal location where any water evacuated from the outer chamber 526 may be safely disposed of. A check valve 516 is arranged in the pump line 512.

Figure 9:
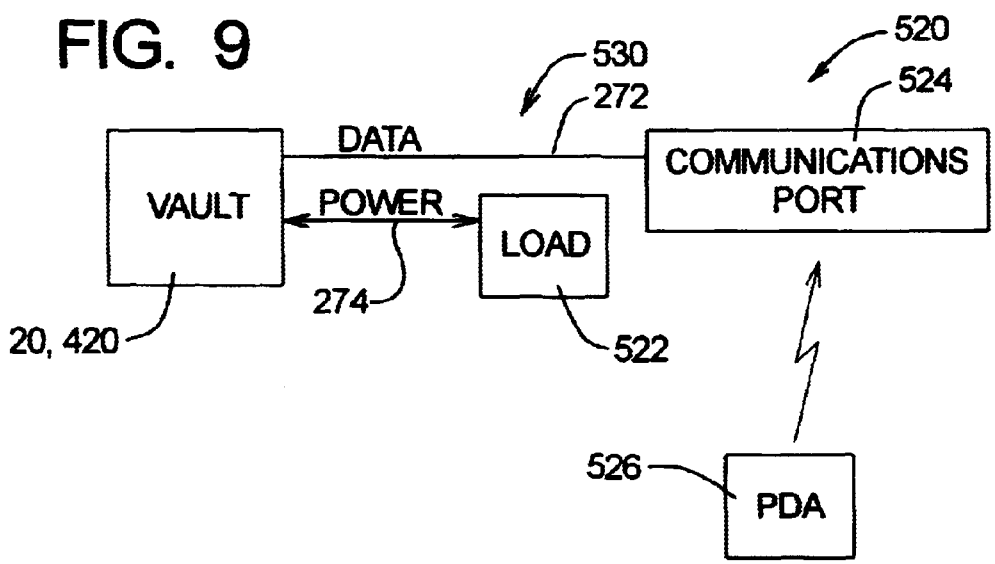
FIG. 9 is a block diagram illustrating the electrical portion of the battery vault system of FIG. 6 in a common environment in which it may be used.
Figure 10:
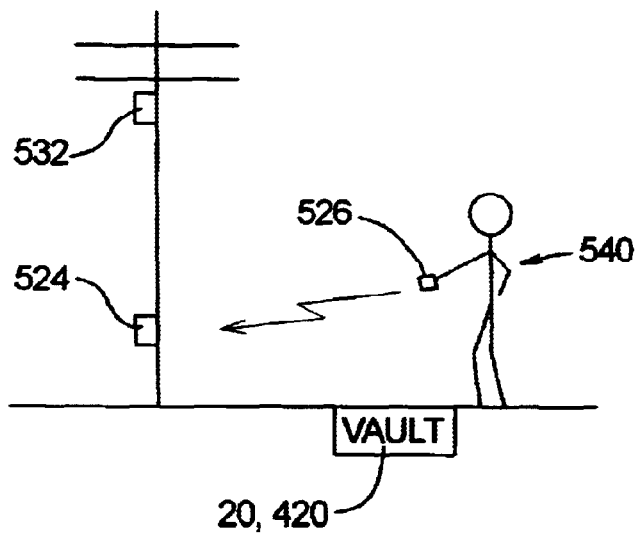
FIGS. 10 and 11 are elevation views schematically depicting exemplary environments in which the vault enclosure systems described herein may be used.
Figure 11:
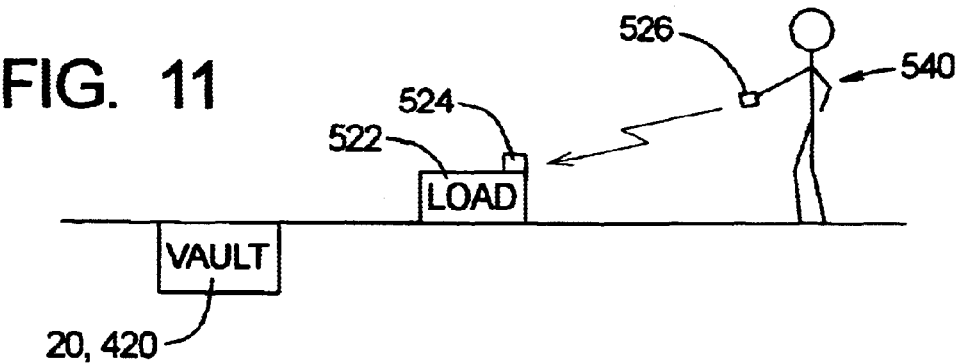

Referring for a moment now to FIGS. 9–11, depicted therein is a block diagram illustrating a vault system 520 employing an option data capture feature of a vault assembly of the present invention. The vault system 520 comprises a load 522, a data transmission module 524, and a data acquisition device 526.

As generally described above, the vault assembly 20, 420 supplies power through the power cables 274 to the load 522; the load 522 may be a UPS system, telecommunications equipment, traffic light control electronics, a communications repeater, or the like.

The vault assembly 20, 420 further generates status and control data relating to the vault system and/or batteries contained therein that is accessible over the data cables 272. The data cables 272 are further connected to the data transmission module 524. The data cables 272 thus form an integral part of a first communications system 530 that allows the status and control data to be transferred from the vault system 20,420 to the data transmission module 524.

The data acquisition unit 526 may be any portable device capable of running software that can capture the status and control data and/or generate control data for controlling the vault assembly 20,420. An inexpensive device appropriate for use as the data acquisition unit 526 is a personal digital assistant such as a device capable of running the PALM operating system. Certain models of such PDA's employ a built-in infrared data port, and such a data port is very appropriate for use with the present invention. However, other types of data ports, such as parallel, serial, USB, or other may be appropriate in other situations. A second communications system 532 is thus established that allows communications between the data transmission module 524 and the data acquisition device 526.

As shown in FIGS. 10 and 11, the vault assembly 20,420 is often located underground. Access to interior of the underground vault assembly 20,420 is relatively inconvenient. The term "inaccessible" will be used to refer to the location of an object that cannot be conveniently physically accessed. The first communications system 530 thus allows access to data stored in the physically inaccessible vault assembly 20,420.

The load 522 is often located in an inaccessible location, such as on a telephone pole (FIG. 10) or a relatively accessible location such as a ground mounted cabinet (FIG. 11). In either situation, the data transmission module 524 is located so that a service technician 540 may use the second communications system 532 to access status and control data stored in the vault assembly 20,420. If the data acquisition device 526 is a PDA having a built-in infrared data port and the data transmission module 524 employs a similar infrared data port, the technician 540 simply aims the device 526 at the module 524 to control the vault system 20, 420 and/or download status data therefrom.

III. Conclusion

The present invention may be embodied in forms other than the preferred embodiment described above. For example, while the features of the present invention described above are preferably all included in a commercial embodiment of the present invention, not all of these features are required to implement the invention in a more basic form. Accordingly, the scope of the present invention should be determined with reference to the claims as appended hereto or subsequently amended and not the foregoing detailed description.

What is claimed is:

1. A vault system for batteries that supply a battery power signal to an electronic device, comprising:
   an outer enclosure assembly defining an outer chamber, where the batteries are arranged within the outer chamber;
   an inner enclosure assembly arranged within the outer chamber, where the inner enclosure assembly defines at least one inner chamber;
   control equipment associated with supplying the battery power signal to the electronic device, where at least a portion of the control equipment is located within the at least one inner chamber;
   at least one electrical cable associated with supplying the battery power signal to the electronic device, where the at least one electrical cable extends from the at least one inner chamber to the outer chamber; and
   a sealing system arranged to seal the at least one inner chamber such that fluid within the outer chamber is substantially prevented from reaching the at least one inner chamber.

2. A vault system as recited in claim 1, in which:
   the inner enclosure assembly comprises a tray member and a cover member; wherein
   the sealing system comprises a gasket member for sealing a gap between the cover member and the tray member.

3. A vault system as recited in claim 1, in which:
   the inner enclosure assembly comprises a tray member and a cover member; wherein
   the sealing system comprises
      a gasket member for sealing a first gap between the cover member and the tray member, and
      a sealing compound arranged to seal a second gap between the tray member and the at least one electrical cable.

4. A vault system as recited in claim 1, in which:
   the inner enclosure assembly comprises a tray member and a cover member; wherein
   the sealing system comprises
      a gasket member for sealing a first gap between the cover member and the tray member,
      a sealing compound arranged to seal a second gap between the tray member and a first electrical cable, and
      a seal assembly for sealing a third gap between the tray member and a second electrical cable.

5. A vault system as recited in claim 1, in which:
   the inner enclosure assembly comprises a tray member and a plurality of cover members; wherein
   each of the cover members engages the tray member to define a plurality of inner chambers.

6. A vault system as recited in claim 1, in which:
   the tray assembly defines first and second inner chambers;
   a first portion of the control equipment is located in the first inner chamber; and
   a second portion of the control equipment is located in the second inner chamber.

7. A vault system as recited in claim 1, in which:
   the inner enclosure assembly comprises a tray member and first and second cover members; wherein
   the first cover member is detachably attached to the tray member to define the first inner chamber; and
   the second cover member is permanently attached to the tray member to define the second inner chamber.

8. A vault system as recited in claim 7, in which:
   the first portion of the control equipment comprises at least one terminal set arranged within the first inner chamber;
   the second portion of the control equipment comprises at least one circuit board arranged within the second inner chamber; and
   the at least one electrical cable comprises
      at least one lead pair associated with each battery, where each lead pair is connected at one end across terminals of the battery associated therewith and at another end to the at least one terminal set, at least one control cable extending between the terminal set and the circuit board, and power cables extending from the control enclosure to the electronic device, where the terminal set interconnects the at least one lead pair and the power cables such that the battery power signal is generated by the batteries connected to the at least one lead pair and is present across the power cables.

9. A vault system as recited in claim 8, in which:

the circuit board comprises a display means; and data input means; whereby the display means is visible and the data input means is accessible through the second cover member.

10. A vault system for batteries that supply a battery power signal to an electronic device, comprising:

an outer enclosure assembly defining an outer chamber, where the batteries are arranged within the outer chamber;

a blower assembly arranged within the outer enclosure member;

a conduit operably extending between the outer enclosure assembly and a termination location;

at least one electrical cable extending between the outer chamber and the termination location through the conduit, where the at least one electrical cable carries the battery power signal;

a blower hose extending between the blower assembly and the termination location through the conduit; whereby operation of the blower assembly circulates air from the termination location to the outer chamber through the conduit and out of the outer chamber to the termination location through the blower hose.

11. A vault system for batteries that supply a battery power signal to an electronic device, comprising:

an outer enclosure assembly defining an outer chamber, where the batteries are arranged within the outer chamber;

a pump assembly arranged within the outer enclosure member;

a pump hose operatively connected between the pump assembly and a disposal location;

a pump control circuit for controlling operation of the pump assembly, where the pump control circuit periodically operates the pump assembly such that fluid at the bottom of the outer enclosure assembly is forced through the pump hose to the disposal location, and monitors a pump current drawn by the pump assembly to determine at least one characteristic of the pump selected from the group consisting of determining whether the pump is working and determining whether the pump is loaded.

12. A vault system for batteries that supply a battery power signal to an electronic device, comprising:

an outer enclosure assembly defining an outer chamber, where the batteries are arranged within the outer chamber and access to the outer enclosure assembly is restricted;

control equipment located in the outer chamber for generating vault data indicative of at least one characteristic associated with the vault system;

a data transmission module arranged at an accessible location;

a first data transmission system that allows transfer of data between the control equipment and the data transmission module;

a data acquisition device; and a second data transmission system that allows transfer of data between the data transmission module and the data acquisition device; whereby vault data is transmitted to the data acquisition device through the first data transmission system, the data transmission module, and the second data transmission system.

* * * * *

UNITED STATES PATENT AND TRADEMARK OFFICE
CERTIFICATE OF CORRECTION

PATENT NO. : 6,617,973 B1
DATED : September 9, 2003
INVENTOR(S) : Osterman

It is certified that error appears in the above-identified patent and that said Letters Patent is hereby corrected as shown below:

<u>Title page,</u>
Item [76], Inventor, "Thomas A. Osterman" should read -- Thomas S. Osterman --

Signed and Sealed this

Sixteenth Day of December, 2003

JAMES E. ROGAN
*Director of the United States Patent and Trademark Office*